(12) United States Patent
De Moliner et al.

(10) Patent No.: US 12,302,480 B2
(45) Date of Patent: May 13, 2025

(54) INDUCTION HEATER FOR A COOKING SURFACE

(71) Applicant: I.R.C.A. S.P.A. INDUSTRIA RESISTENZE CORAZZATE E AFFINI, Vittorio Veneto (IT)

(72) Inventors: Antonio De Moliner, Oderzo (IT); Fabrizio Dughiero, Padua (IT); Francesco Giusto, Mestre (IT); Marcello Zerbetto, Padua (IT); Federico Zoppas, Treviso (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 1055 days.

(21) Appl. No.: 16/762,537

(22) PCT Filed: Nov. 9, 2018

(86) PCT No.: PCT/IB2018/058829
§ 371 (c)(1),
(2) Date: May 8, 2020

(87) PCT Pub. No.: WO2019/092651
PCT Pub. Date: May 16, 2019

(65) Prior Publication Data
US 2020/0267805 A1    Aug. 20, 2020

(30) Foreign Application Priority Data
Nov. 10, 2017  (IT) .................... 102017000128351

(51) Int. Cl.
*H05B 6/12*    (2006.01)
(52) U.S. Cl.
CPC ......... *H05B 6/1209* (2013.01); *H05B 6/1254* (2013.01); *H05B 6/1263* (2013.01);
(Continued)

(58) Field of Classification Search
CPC .. H05B 6/1209; H05B 6/1254; H05B 6/1263; H05B 6/1281
(Continued)

(56) References Cited

U.S. PATENT DOCUMENTS 5,866,884 A * 2/1999 Cornec ................ H05B 6/1281
                                                    219/622
8,569,666 B2 * 10/2013 Gutierrez ............. H05B 6/1272
                                                    219/625

(Continued)

FOREIGN PATENT DOCUMENTS

DE        102011083125    *  3/2013   ........... H05B 6/1245

OTHER PUBLICATIONS

Machine Translation of DE102011083125A; (Year: 2023).*

*Primary Examiner* — Steven W Crabb
*Assistant Examiner* — Thomas J Ward
(74) *Attorney, Agent, or Firm* — Amster, Rothstein & Ebenstein LLP (57) ABSTRACT

An induction heater for a cook top comprising: —a first electrically insulating sheet (1); —a second electrically insulating sheet (2); —one or more inductors (5) arranged on a same plane between the first sheet (1) and the second sheet (2), each inductor (5) comprising a single electrically conductive track defining a flat spiral coil; —at least one magnetic flux concentrator (4) arranged on a plane under the second sheet (2); —a metallic heat sink plate (3) arranged under the at least one magnetic flux concentrator (4), adapted to dissipate the heat produced by the one or more inductors (5).

19 Claims, 5 Drawing Sheets

(52) U.S. Cl.
CPC ..... *H05B 6/1281* (2013.01); *H05B 2206/022* (2013.01); *H05B 2213/03* (2013.01)

(58) Field of Classification Search
USPC ........................................................ 219/623
See application file for complete search history.

(56) References Cited

U.S. PATENT DOCUMENTS

| | | | |
|---|---|---|---|
| 2009/0212042 A1* | 8/2009 | Lee ...................... | H05B 6/1272 219/624 |
| 2010/0237064 A1* | 9/2010 | Liu ...................... | H05B 6/1209 219/622 |
| 2012/0062052 A1* | 3/2012 | Best ........................ | H02K 5/18 310/43 |
| 2013/0112683 A1* | 5/2013 | Hegedis ................ | A47J 36/321 219/660 |

* cited by examiner

INDUCTION HEATER FOR A COOKING SURFACE

CROSS REFERENCE TO RELATED APPLICATION

This application claims benefit under 35 U.S.C. § 371 to international application No. PCT/IB2018/058829 filed on Nov. 9, 2018, which claims priority to Italian application No. IT 102017000128351 filed Nov. 10, 2017, the contents of which are incorporated by reference in their entireties.

FIELD OF THE INVENTION

The present invention relates to an induction heater for a cook top, e.g. the cook top of a kitchen, and to a cook top comprising such induction heater.

BACKGROUND ART

Induction cook top make it possible to heat saucepans with ferromagnetic bottom and are increasingly more used.

An induction cook top comprises a given number of inductors fixed to a supporting structure.

In a first type of cook top, the arrangement and the number of the inductors is such that each inductor corresponds to a specific position in which a saucepan must be positioned, substantially as on gas stoves. In other words, each saucepan must be positioned above a respective inductor.

Recently, alternative solutions are being developed, in which the saucepan can be positioned freely in any area of the cook top. In this second type, the dimensions of the cook top being the same, the number of inductors is greater and the radial dimension of each inductor is smaller. By means of an appropriate electronic controller, the inductors can be activated independently from one another and automatically as a function of the position of the saucepan.

This second type of cook top opens a scenario which poses new technological challenges to manufacturers. In particular, the optimization of the geometric parameters of the inductors and their arrangement is not simple and is of crucial importance.

In particular, adequate power must be guaranteed for any position of the saucepan.

Furthermore, for any position of the saucepan, the modulation of the power applied by the user must be gradual avoiding undesired peaks.

These problems are even more obvious when one attempts to reduce the size of the cook top components.

Indeed, a further drawback of the induction cook tops, of the first and of the second type alike, resides in the large overall dimensions and weight of their components, in particular of the inductors and of the structure to which they are fixed.

In particular, it is desirable to be able to reduce the size of the inductors and of their support structure.

However, in attempting to obtain this result, one must take into account that on one hand, the inductors with reduced thickness must guarantee a high power, while on the other greater overheating problems arise because the heat is concentrated in a smaller thickness. These aspects pose a serious limit to the actual development and use of thin components.

Another drawback of the components for induction cook tops resides in the electrical coupling between the inductors and the power module used to power them. The electrical connections which are used envisage the use of connecting wires. Therefore, during the step of assembly, the intervention of an operator who must manually establish these connections is necessary. Additionally, when attempting to reduce the thickness of the components, the space for making these connections is very small and therefore the operation is particularly difficult.

SUMMARY OF THE INVENTION

It is an object of the present invention to provide an induction heater for a cook top which is thin and which at the same time makes it possible to obtain an efficient heat dissipation, in particular of the heat developed on the inductors.

It is another object of the present invention to provide an induction heater for a cook top which is thin and which at the same time can provide adequate power to a saucepan to be heated.

It is another object of the present invention to provide an induction heater for a cook top which is thin and which at the same time can be manufactured in automated manner.

The present invention achieves at least one of such objects, and other objects which will be apparent in light of the present description, by means of an induction heater for a cook top comprising:
- a first electrically insulating sheet;
- a second electrically insulating sheet;
- one or more inductors, e.g. a plurality of inductors, arranged on a same plane between the first sheet and the second sheet, each inductor comprising a single electrically conductive track defining a flat spiral coil;
- at least one magnetic flux concentrator arranged on a plane under the second sheet;
- a metallic heat sink plate arranged under the at least one magnetic flux concentrator, adapted to dissipate the heat produced by the one or more inductors, preferably wherein the thickness of the first sheet is less than 1 mm; the thickness of the second sheet is less than 1 mm; and the thickness of each inductor is either less than or equal to 0.5 mm.

Advantageously, in this manner, the at least one magnetic flux concentrator is very close to the inductors. Therefore, a considerable improvement is achieved in the efficiency and controllability of the inductors. In particular, less heat is dissipated and the inductors, although they are very thin, can deliver an adequate power. Furthermore, as less heat is dissipated, a thin metal plate can be used.

Preferably, the at least one magnetic flux concentrator is in contact, preferably in direct contact, with the second sheet.

Preferably, the distance, in particular the minimum distance, between the barycenter of each inductor and the at least one magnetic flux concentrator is comprised between 200 and 1000 µm, preferably between 200 and 600 µm.

For example, when one magnetic flux concentrator is provided for each inductor, said minimum distance is the shortest distance between the barycenter of each inductor and the respective magnetic flux concentrator.

According to an aspect, the invention further comprises a cook top having an upper surface destined to be a supporting surface for at least one saucepan to be heated, comprising at least one heater as defined above.

Advantageously, by means of the metal plate, the heat produced by the inductors is dissipated effectively. In particular, it is dissipated the heat which is generated on inductors due to the passage of current by Joule effect.

Also, preferably, there is no need for additional ventilation means, e.g. fans, for dispersing heat or it is possible to reduce the use of such ventilation means.

Advantageously, according to another aspect, the geometric parameters of the inductors are carefully selected so as to provide adequate power while being very thin. Additionally, adequate power is guaranteed even when a saucepan is not perfectly at a single inductor.

Advantageously, according to another aspect, an induction heater is provided wherein the electrical connection between the inductors and an electronic power module is made without connecting wires, so that the assembly of the heater is easier and more automated.

Further features and advantages of the present invention will be more apparent in light of the detailed description of preferred, but not exclusive embodiments.

The dependent claims describe particular embodiments of the invention.

BRIEF DESCRIPTION OF THE FIGURES

The description of the invention refers to the accompanying drawings, which are provided by way of non-limiting example, in which.

The same elements, or elements which have the same function, have the same reference number.

DESCRIPTION OF EXAMPLE EMBODIMENTS OF THE INVENTION

According to an embodiment, the induction heater, or induction heating element, for a cook top comprises:
- a first electrically insulating sheet 1;
- a second electrically insulating sheet 2;
- a plurality of inductors 5 arranged on a same plane between the first sheet 1 and the second sheet 2, each inductor 5 comprising, preferably being formed by, a single electrically conductive track defining a flat spiral coil;
- at least one magnetic flux concentrator 4 arranged on a plane under the second sheet 2;
- a metallic heat sink plate 3 arranged under the at least one magnetic flux concentrator 4, adapted to dissipate the heat produced by the plurality of inductors 5.

The sheet 1, the sheet 2, the inductors 5 and the metal plate 3 are much thinner than they are wide and long.

Preferably, the total thickness H1 (FIG. 9) of the first sheet 1, of an inductor 5, of the second sheet 2, of the at least one magnetic flux concentrator 4 and of the metal plate 3 is comprised between 4 and 12 mm, e.g. either less than or equal to 9.5 mm.

The inductors 5 are substantially incorporated between the sheet 1 and the sheet 2, so as to form a sandwich. The inductors 5 have an upper side which adheres to the sheet 1 and a lower side which adheres to the sheet 2. In other words, both the sheet 1 and the sheet 2 adhere (i.e. are directly in contact with), to all of the inductors of said plurality of inductors. Such adhesion can be implemented, for example, by fixing means, e.g. by means of a bi-adhesive layer or by means of glue. Preferably, with the exception of said fixing means, no other layers are provided between each sheet 1, 2 and each inductor 5.

Preferably, only one sheet 1 is provided and preferably only one sheet 2 is provided.

Preferably, the sheet 1 and the sheet 2 are flexible so that, at least in some areas, the sheet 1 and the sheet 2 also adhere to each other. In particular, it is preferable for the sheet 1 and the sheet 2 to adhere at least partially to each other in the gaps which are present between the inductors 5. Furthermore, the peripheral edges of the sheet 1 and sheet 2 adhere to one another.

Preferably, sheet 1 is made of mica. Preferably, the sheet 1 is less than 1000 µm thick. In a particularly preferable manner, the thickness of the sheet 1 is less than 500 µm, more preferably is comprised between 100 and 400 µm.

Preferably, the sheet 2 is made of polymeric material. For example, the sheet 2 can be made of an elastomeric material, such as a type of silicone, or polyamide (PI), in particular Kapton®, or a material containing aramid fibers, in particular Nomex®.

Preferably, the sheet 2 is less than 1000 µm thick. In a particularly preferable manner, the thickness of the sheet 2 is less than 500 µm, more preferably is comprised between 25 and 100 µm.

The sheet 1 and the sheet 2 may also be made of the same material and, in this case, may optionally have the same thickness. For example, the sheet 1 and the sheet 2 may be both made of mica, and preferably have a thickness of less than 500 µm, more preferably comprised between 100 and 400 µm; alternatively, the sheet 1 and the sheet 2 may both be made of polymeric material, e.g. one of the materials mentioned above, and preferably have a thickness of less than 500 µm, more preferably between 25 and 100 µm.

Optionally, the sheet 1 and/or the sheet 2 have a compact, i.e. non-porous structure or microstructure. Preferably, the sheet 1 is a continuous element, and/or preferably sheet 2 is a continuous element. Each inductor 5 is typically made of a metal material, e.g. copper or aluminum, preferably copper, or may be made by means of conductive ink or conductive paste.

Preferably, each inductor 5 is made by etching, in particular by chemical etching, of a metal element, e.g. a sheet or foil, preferably of copper or aluminum.

Figure 3:
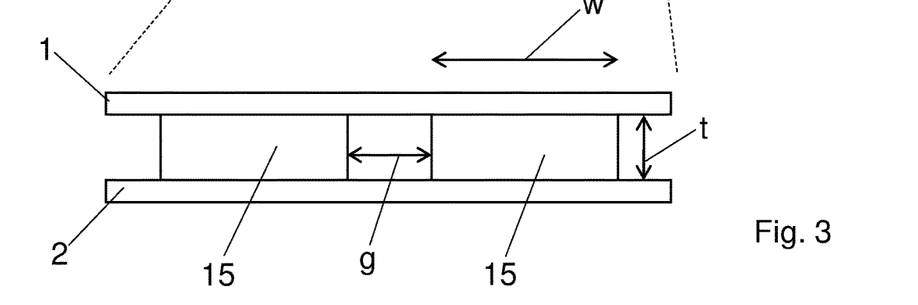
FIG. 3 diagrammatically shows a detail of FIG. 2.

Preferably, each inductor 5 has a thickness comprised between 100 and 500 µm, or between 200 and 400 µm, or between 250 and 400 µm, or between 250 and 450 µm, or between 250 and 390 µm, or between 250 and 350 µm, or between 280 and 350 µm. In FIG. 3, the thickness of each inductor 5, in particular of each of its turns 15 or equivalently of the conductive track, is indicated by reference "t".

Each inductor 5 defines a respective X axis about which the turns 15 are wound. Such an axis X passes through the barycenter C of each inductor 5. The thickness t of each inductor 5 is a length which develops parallel to the axis X. The turns 15 form a single electrically conductive track, different from a Litz wire. The track is formed by a single layer. Preferably, such track is structurally homogeneous, in particular along its thickness, i.e. is without discontinuities.

Preferably, the distance "g" between each turn 15 and the next, i.e. the consecutive turn, is comprised between 150 and 1500 µm; more preferably between 250 and 500 µm; even more preferably between 300 and 400 µm. Such distance g is either perpendicular or substantially perpendicular to the thickness t.

Preferably, the distance g between the consecutive turns, e.g. between two adjacent, i.e. consecutive, turns, is equal or substantially equal for all the turns 15, i.e. remains constant or substantially constant.

Preferably, the ratio g/t is comprised between 0.5 and 3, or between 0.5 and 1.5, or between 0.5 and 1, or between 1 and 1.5, the extreme values being preferably included. In a particularly preferred way, the ratio g/t is either less than or equal to 1.5, more preferably is comprised between 0.5 and 1.5. For example, the ratio g/t may be equal to or approximately equal to 0.5; or to 0.6; or to 0.7; or to 0.8; or to 0.9; or to 1 or 1.1; or 1.2; or 1.3; or 1.4; or 1.5.

Preferably, the width w of each turn 15 is comprised between 100 and 1000 µm, more preferably between 200 and 700 µm, even more preferably 400 and 600 µm. Preferably, the width w is equal for all the turns 15, i.e. remains constant. Such width w is perpendicular to the thickness t.

Preferably, the pitch of the turns, i.e. the distance between corresponding points of one turn and the consecutive one, i.e. the immediately subsequent one, is comprised between 250 and 2500 µm, preferably between 600 and 1000 µm.

The number of turns 15 of each inductor 5 is preferably comprised between twenty-five and seventy-five, more preferably between thirty and seventy, even more preferably between thirty five and fifty.

Figure 3A:
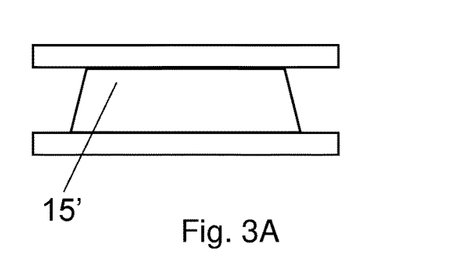
FIGS. 3A and 3B diagrammatically show two possible variants of the section of the turns of an inductor.
Figure 3B:
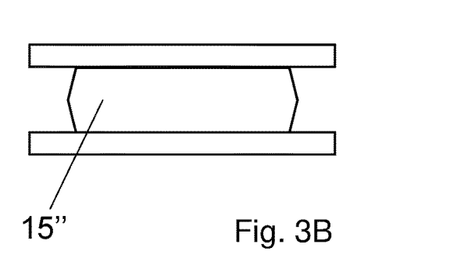
Figure 4:
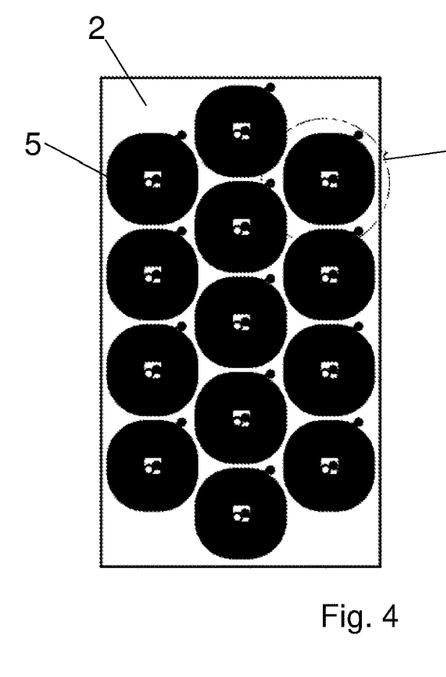
FIG. 4 shows a top plan view of some components of the induction heater in FIG. 1.
Figure 5:
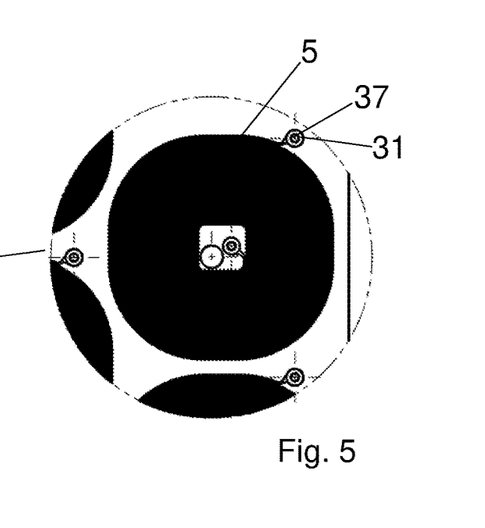
FIG. 5 shows a detail of FIG. 4.

The turns 15 preferably have a rectangular or substantially rectangular section, as shown in FIG. 3. However, in particular when the inductors 5 are made by means of chemical etching, due to process inaccuracies, the section of the turns may not be perfectly rectangular. In particular, the section of the turns may be trapezoidal with sides inclined with respect to the bases. The sides may have the same or mutually different inclination, as diagrammatically shown in FIGS. 3A and 3B, which show two possible cross sections of the turns 15', 15".

Preferably, the possible trapezoidal shape of the section of the turns, does not substantially alter the distance g between the turns and the width w of the turns, which are two quantities which remain substantially constant.

Preferably, each inductor 5 is configured to provide a maximum power of between 300 and 1000 W. Preferably, such maximum power is the power which is supplied to the cook top, in particular at its upper surface.

The number of inductors 5 is variable, preferably from two to twenty-five or from four to sixteen. Preferably, the number of inductors 5 is: at least two, or at least three or at least four, or at least five, or at least six, or at least seven or eight. Alternatively, only one inductor 5 may also be provided.

Figure 7:
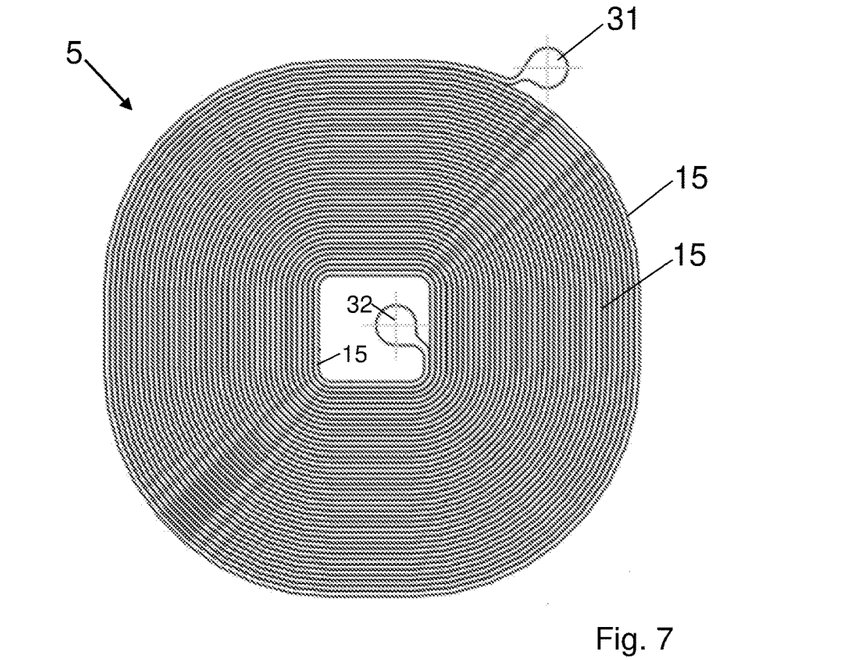
FIG. 7 shows a top plan view of an example of the inductor of the induction heater in FIG. 1.
Figure 8:
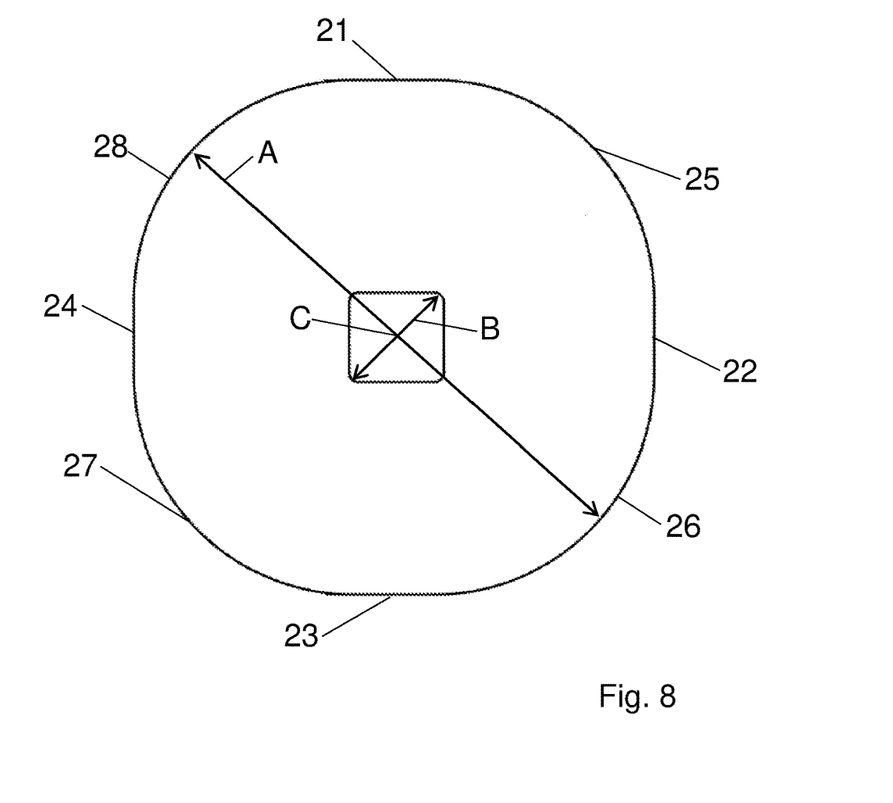
FIG. 8 shows a diagrammatic top view of the component in FIG. 7.

Preferably, the inductors 5 are identical or substantially identical to one another. FIG. 7 shows a top plan view of an example of the inductor 5; In FIG. 8, the outermost turn and the innermost turn of the inductor 5 are diagrammatically shown for the sake of description.

Preferably, each inductor 5 has a maximum dimension comprised between 30 and 240 mm, more preferably between 65 and 130 mm, even more preferably between 80 and 120 mm, e.g. about 80 mm or about 120 mm. In particular, the aforesaid maximum dimension corresponds to the length of the diameter of the circumscribed circumference of the outermost turn 15, this diameter being indicated by reference "A" in FIG. 8.

Preferably, the length of the diameter of the circumscribed circumference of the innermost turn is comprised between 10 and 50 mm, more preferably between 15 and 30 mm, e.g. about 18 mm, such diameter being indicated by reference "B" in FIG. 8.

Preferably, the inductors 5 are shaped so that each turn 15 has four straight stretches 21, 22, 23, 24 mutually parallel in pairs, and four curved stretches 25, 26, 27, 28. Two mutually successive rectilinear stretches are joined by a respective curved stretch. Optionally, only the innermost turn and the outermost turn have one or more fewer rectilinear stretches and/or one or more fewer curvilinear stretches than the other turns.

Preferably, the radius of curvature of the curved stretches 25, 26, 27, 28 gradually increases, preferably linearly, from the innermost turn to the outermost turn. Preferably, between one turn and the next, the radius of curvature increases by a value equal to the distance g+w (FIG. 3), i.e. a value equal to the pitch between the turns. Preferably, the curved stretches of each turn have a radius of curvature either equal or substantially equal to each other. Preferably, the radius of curvature of the curved stretches of the innermost turn is comprised between 0.5 and 5 mm, and the radius of curvature of the curved stretch of the outermost turn is comprised between 20 and 60 mm.

Alternatively, it is however possible to provide one or more inductors in which the radius of curvature of the curved stretches is substantially the same for all turns, e.g. with a value selected in the range from 5 to 10 mm.

It has been experimentally observed that if the radius of curvature increases gradually from the inside outwards, the efficiency of the inductor is greater than the case in which the radius of curvature remains constant for all turns. In particular, a reduction in the power dissipated on the inducers of 20-25% has been observed. In another alternative, each turn is substantially circular.

Each inductor 5 has two terminals 31, 32, (FIG. 7) or pads, which are used for their electrical power supply. In particular, a terminal 31 extends from the outermost turn towards the outside of the inductor 5, and the other terminal 32 extends from the innermost turn towards the inside of the inductor 5. Preferably, the terminals 31, 32 have substantially the shape of an eyelet.

Alternatively, it can be provided that the inductors are connected to one another and only two terminals are provided in common for all the inductors or each inductor has only one terminal which is provided in common for all the inductors. In these two cases, by way of example only, the inductors may be made by means of a single conductive track, shaped so as to have portions spirally wound to form inductors, and connecting portions between the inductors.

Preferably, the minimum distance between two adjacent, i.e. consecutive, inductors 5 is comprised between 4 mm and 20 mm, more preferably between 5 and 10 mm, e.g. about 5 mm.

Preferably, the inductors 5 are distributed so that the saucepan to be heated (not shown) can be positioned substantially freely on the cook top. In other words, the bottom of the saucepan can be arranged above a portion of multiple inductors, e.g. above only a respective portion of four inductors.

Preferably, the inductors 5 are arranged according to a grid, more preferably according to a honeycomb grid. In particular, the barycenters C of the inductors 5 of a first row are offset with respect to the barycenters C of the inductors 5 of a second row, immediately successive (i.e. consecutive) to the first row, and aligned with the barycenters of the inductors 5 of a third row, consecutive to the second row. Preferably, three rows of inductors 5 are provided.

Preferably, the induction heater comprises at least one magnetic flux concentrator 4 arranged between the sheet 2 and the metal plate 3, for each inductor 5.

Preferably, each magnetic flux concentrator is in contact, preferably in direct contact, with the second sheet 2.

Preferably, the distance, in particular the minimum distance, between the barycenter of each inductor 5 and the respective magnetic flux concentrator 4 is comprised between 200 and 1000 μm, preferably between 200 and 600 μm.

Preferably, each magnetic flux concentrator 4 is preferably coaxial to the respective inductor 5. In particular, the barycenter of each magnetic flux concentrator 4 is preferably aligned along the axis X with the barycenter of a respective inductor 5. Preferably, the magnetic flux concentrators 4 are substantially identical or substantially identical to each other.

Each magnetic flux concentrator 4 is preferably made of ferrite and preferably has a plan geometry and dimensions substantially similar to those of the respective inductor 5. In particular, each magnetic flux concentrator 4 has an outer contour having four straight stretches mutually parallel in pairs, and four curved stretches. Two mutually rectilinear stretches are joined by a respective curved stretch.

Furthermore, each magnetic flux concentrator 4 preferably has a central hole delimited by a wall having the same shape but smaller size with respect to the aforesaid outer contour.

Alternatively, a single magnetic flux concentrator may be provided made as a single layer, preferably either made of ferrite or containing ferrite, e.g. silicone containing ferrite particles. In a further alternative, it is possible to use a plurality of magnetic flux concentrators, e.g. shaped as ferrite bars, substantially parallelepiped-shaped.

In any case, preferably, the at least one magnetic flux concentrator 4 has a thickness comprised between 2 and 4 mm, e.g. about 3 mm.

Advantageously, the metal plate 3 is provided below the magnetic flux concentrators 4. Preferably, the metal plate 3 has a thermal conductivity greater than 100 $W \cdot m^{-1} \cdot K^{-1}$. Preferably, the metal plate 3 is made of aluminum or an alloy containing aluminum.

The metal plate 3 has a width and a length substantially equal to that of the sheet 1 and sheet 2. The thickness of the metal sheet 3 is preferably comprised between 0.5 mm and 3 mm, even more preferably from 1 to 2 mm.

Preferably, the magnetic flux concentrators 4 preferably rest on the metal plate 3. Preferably, the magnetic flux concentrators 4 each have an upper face adjacent to the sheet 2 and a lower face adjacent to the metal plate 3.

Figure 9:
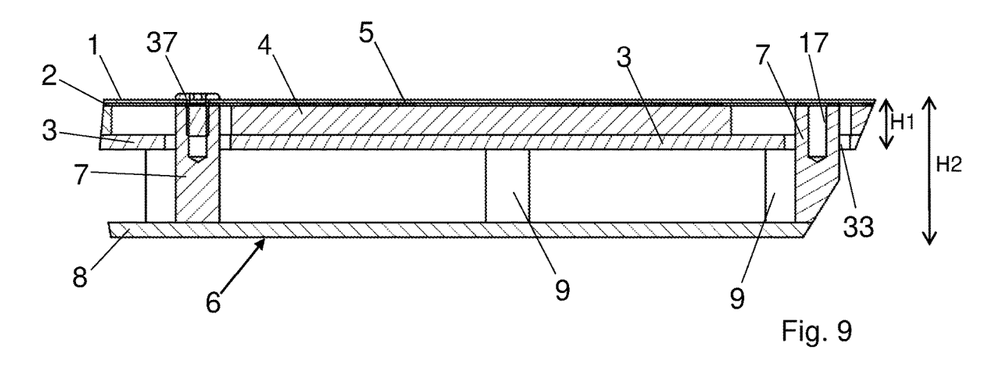
FIG. 9 shows a top plan view of a part of the induction heater in FIG. 1.

The induction heater further comprises an electronic power module 6, shown for example in FIG. 9. Preferably, the electronic power module 6 comprises a plurality of columns 7, or connectors, which are used to electrically supply the inductors 5. The columns 7 are made of electrically conductive material, preferably metal, e.g. brass.

The columns 7 rise vertically, in particular parallel to the axes X, from an electronic board 8, which substantially acts as a base plate, of the electronic power module 6. One column is provided for each terminal. In particular, when each inductor has two terminals 31, 32, two columns 7 are provided for each inductor 5. Each column 7 is connected to a respective terminal 31, 32 of each inductor 5 by means of electrical connection and fixing means 37, i.e. which have the dual function of forming an electrical connection and fixing at the same time.

Preferably, such electrical connection and fixing means either are or comprise screws 37. The screws 37 are made of electrically conductive material, preferably metal, e.g. stainless steel or brass.

Figure 1:
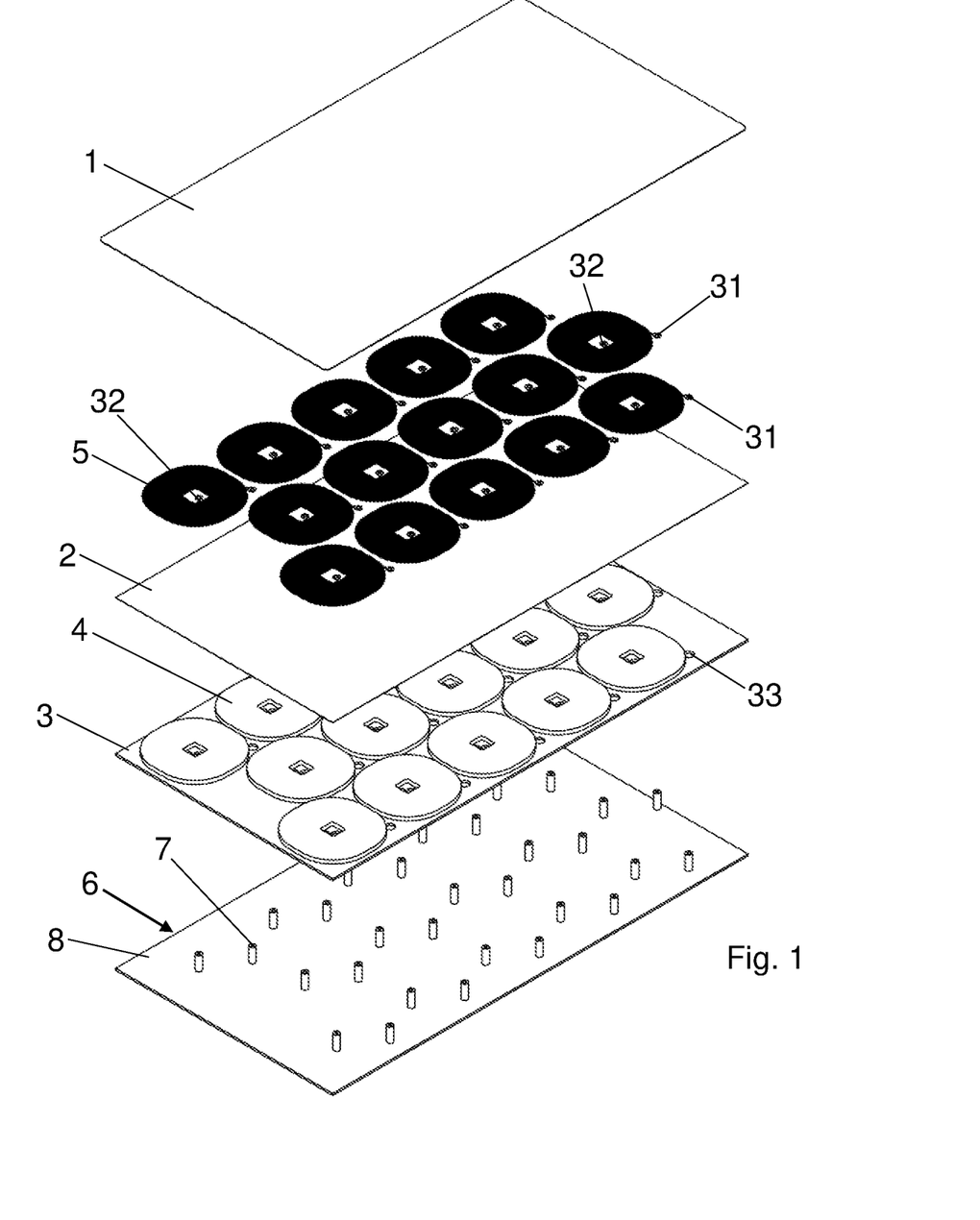
FIG. 1 diagrammatically shows an exploded view of a heater according to the invention.
Figure 2:
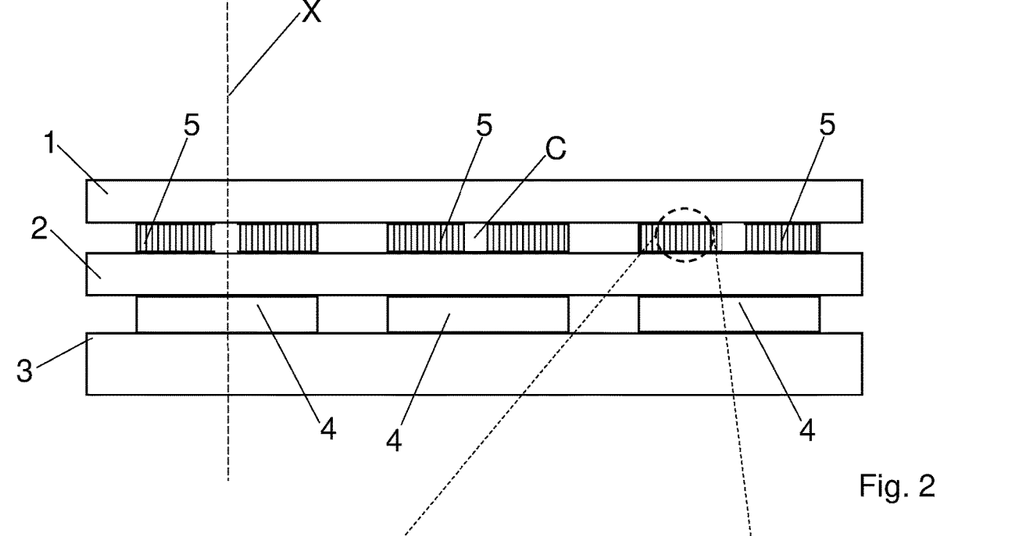
FIG. 2 diagrammatically shows a section of a part of the heater in FIG. 1.

In particular, the columns 7 pass through the metal plate 3 and have an upper edge in contact, preferably in direct contact, with the lower surface of the sheet 2 and/or with the lower surface of the terminal 31, 32 according to the dimensions of the holes of the sheet 2. The metal plate 3 is provided with a plurality of holes 33 (FIGS. 1 and 9), wherein each hole 33 is coaxial with a respective column 7. Each column 7 is internally provided with a threaded housing 17 for a respective screw 37.

The screws 37 pass through the sheet 1 and the sheet 2. Indeed, both the sheet 1 and the sheet 2 have a plurality of holes, of which each hole is coaxial with a respective hole 33, and therefore with a respective column 7. Each screw 37 is fastened into a respective column 7. Each screw is in contact with a respective terminal 31, 32 of each inductor 5. Preferably, the head of each screw 37 is in contact, preferably in direct contact, with a respective terminal 31, 32, in particular with its upper surface, which is the surface distal from the electronic board 8. In such manner, the electronic power module 6 may supply the inductors 5. Indeed, the electrical current passes through the columns 7 and the screws 37 to reach the terminals 31, 32. Alternatively, it can also be provided that the upper edge of each column may be in contact with a respective terminal 31, 32, while the head of the screw is in contact with the sheet 1; and/or that the upper edge of each column 7 and the head of each screw 37 are both in direct contact with the respective terminal 31, 32.

Alternatively to the screws 37, rivets or pins (not shown) may be provided. In this case, the walls of the housings of the columns are substantially smooth, i.e. not threaded. Furthermore, each rivet or each pin passes vertically through the whole respective column and the electronic board 8. When rivets are provided, the head of each rivet abuts with the lower surface of the electronic board 8, while the counterhead abuts with the sheet 1 and/or with a respective terminal 31, 32, or vice versa. In particular, in this case, the lower surface of the electronic board 8 is appropriately electrically isolated from the head of the rivet.

When pins are provided instead, brazing is used for fixing to the sheet 1 and to the electronic board 8.

Advantageously, when the electrical connection and fixing means 37 and columns 7 are provided, the electrical connection between inductors 5 and electronic power module 6 is made without the use of supply wires. However, it is worth noting that as an alternative it is also possible to provide connections between the inductors and electronic power module which envisage wires.

The columns 7, which are all mutually equal, have a height preferably comprised between 10 and 20 mm, more preferably between 12 and 18 mm.

The metal plate 3 and the electronic board 8 of the electronic power module 6 are spaced apart from each other. In particular, the lower surface of the metal plate 3 is spaced from the upper surface of the electronic board 8. Preferably, between the lower surface of the metal plate 3 and the upper surface of the electronic board 8 an empty gap is provided.

Advantageously, the total thickness H2 (FIG. 9) of the induction heater, comprising the electronic power module 6, is comprised between 14 and 26, more preferably between 16 and 22, e.g. about 20 mm. In particular, such overall thickness H2 is the thickness of the structure formed by sheet 1, sheet 2, inductors 5, magnetic flux concentrators 4, metal plate 3 and electronic power module 6. In more detail, this total thickness H2 is the distance between the upper surface of the sheet 1 and the lower surface of the electronic power module 6, in particular of the lower surface of the electronic board 8 of the electronic power module 6.

Preferably, the metal plate 3 is fixed to a plurality of pedestals 9, or spacers, which rise vertically from the electronic board 8. The fixing can be achieved, e.g. by means of screws, in similar manner to the fixing between the columns 7 and the screws 37.

Preferably, the distance between the metal plate 3 and the inductors 5 is either less than or equal to 5 mm, and preferably is between 2.5 and 4.5 mm. In particular, such distance is the distance between the upper surface of the metal plate 3 and the barycenter C of an inductor 5, and is preferably equal for all the inductors 5.

Figure 6:
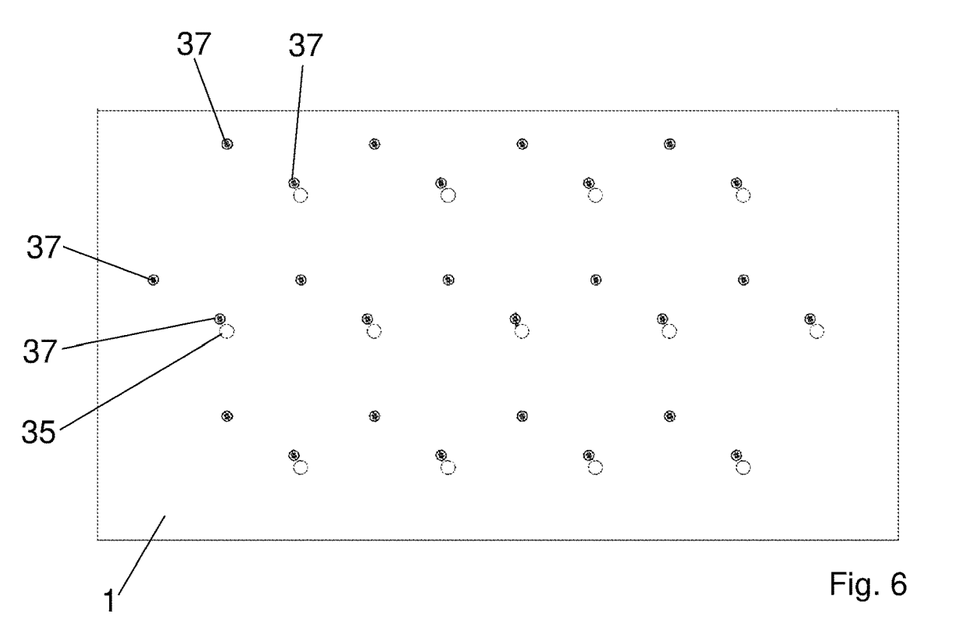
FIG. 6 shows a top plan view of a component of the induction heater in FIG. 1, wherein the inductors are not shown for the sake of description.

Preferably, the induction heater also comprises a plurality of temperature sensors 35 (FIG. 6), preferably a temperature sensor 35 for each inductor 5. The temperature sensors 35 are arranged in respective holes of the sheet 1, sheet 2 and of the metal plate 3. In particular, each temperature sensor 35 is arranged in the zone of each inductor 5, which is surrounded by the innermost turn 15.

Advantageously, the temperature sensors 35 are sensitive to the temperature of the cook top, in particular of its upper surface.

The invention further comprises a method for making an induction heater comprising at least the steps of:
preparing a sandwich structure formed by the first sheet 1, by the second sheet 2 and by the inductors 5 arranged between the first sheet 1 and the second sheet 2;
arranging the sandwich structure so as to align each column 7 of the electronic power module 6 with a respective terminal 31, 32 of the plurality of inductors 5;
electrically connecting each column 7 to a respective terminal 31, 32 and fixing said sandwich structure to said electronic power module 6 by means of the electrical connection and fixing means 37.

Figure 10:
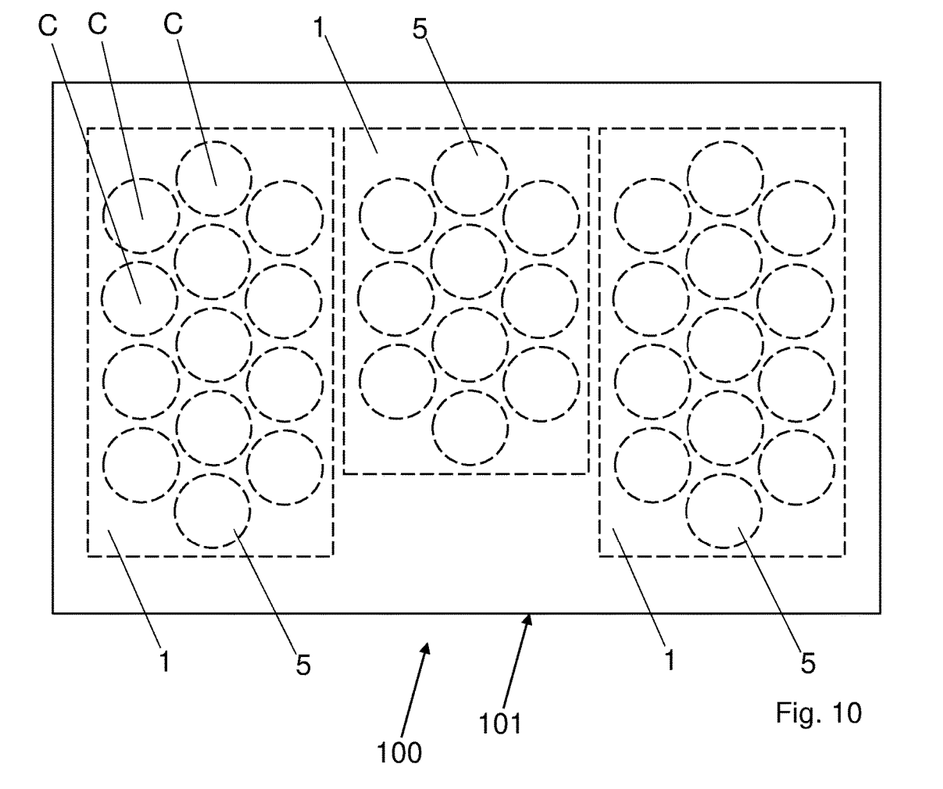
FIG. 10 diagrammatically shows a top plan view of a cook top according to the invention.

The invention further comprises a cook top, e.g. a cook top 100 of a kitchen (FIG. 10).

The cook top 100 has an upper surface 101 destined to be a supporting plane for one or more saucepans to be heated and preferably also a lower surface opposite to the upper surface.

The cook top 100 comprises one or more induction heaters, e.g. an induction heater, or two or three induction heaters. When there are more than one induction heater, the induction heaters are mutually side-by-side and each one is substantially an independent heating module.

Preferably, each module has a width comprised between 23 and 30 cm, such as about 27 cm. Preferably, the length of each module is comprised between 35 and 50 cm, e.g. equal to or approximately equal to 40 cm or equal to or approximately equal to 44 cm.

The induction heater or the induction heaters are arranged under the upper surface 101 of the cook top 100. In particular, each induction heater is arranged so that the sheet 1 and the sheet 2 are respectively in a proximal and distal position with respect to the surface 101.

Advantageously, the distance between the barycenter C of each inductor 5 and the lower surface is preferably less than 3 mm. More preferably, such distance is comprised between about 0.025 and 2 mm.

Advantageously, the barycenters C of the inductors can be positioned very close to the upper surface 101, in particular by virtue of the reduced thickness of the heater according to the invention. In particular, the use of very thin inductors, formed by a single track defining a flat spiral coil, is advantageous.

Since the barycenter C of the inductors is very close to the upper surface 101, the modulation of the power of each inductor, operated by a user, can occur gradually, avoiding undesired peaks.

Advantageously, moreover, the heater of the invention is adapted to be mounted in a cook top the upper surface of which is made of glass or in a cook top the upper surface of which is made of a different material from the glass, e.g. in ceramics or wood. In particular, the heater of the invention can be integrated in a housing of a structure the upper surface of which is intended not only to be used as a cook top but also as a work top for other operations, different from cooking, which are performed in a kitchen. In other words, the same area that can be used to place the saucepans for cooking can also be used as work top.

The invention claimed is:

1. An induction heater for a cook top comprising:
a first electrically insulating sheet;
a second electrically insulating sheet;
one or more inductors arranged on a same plane between the first electrically insulating sheet and the second electrically insulating sheet, each inductor of said one or more inductors comprising a single electrically conductive track defining a flat spiral coil;
at least one magnetic flux concentrator arranged on a plane under the second electrically insulating sheet;
a metallic heat sink plate arranged under the at least one magnetic flux concentrator, adapted to dissipate heat produced by the one or more inductors;
wherein each turn of a plurality of turns of each inductor is shaped so as to have four rectilinear stretches parallel in pairs, and four curved stretches, wherein two mutually successive rectilinear stretches are joined by a respective curved stretch; and
wherein a radius of curvature of the four curved stretches gradually increases from an innermost turn to an outermost turn;
wherein the one or more inductors are provided with at least two terminals;
wherein the induction heater comprises an electronic power module provided with a plurality of electrically conductive columns, and an electrical connection and fixing means inserted in a respective electrically conductive column;
wherein each one of the plurality of electrically conductive columns is electrically connected to a respective terminal of said at least two terminals by the electrical connection and fixing means.

2. The induction heater according to claim 1, wherein a first thickness of the first electrically insulating sheet is less than 1 mm; a second thickness of the second electrically insulating sheet is less than 1 mm; and a third thickness t of each inductor is either less than or equal to 0.5 mm.

3. The induction heater according to claim 1, wherein a heat conductivity of the metallic heat sink plate is greater than 100 $W \cdot m^{-1} \cdot K^{-1}$.

4. The induction heater according to claim 1, wherein a distance either smaller than, or equal to 5 mm is provided between the metallic heat sink plate and the one or more inductors.

5. The induction heater according to claim 1, wherein a first overall thickness of the first electrically insulating sheet, of an inductor of said one or more inductors, of the second electrically insulating sheet, of the at least one magnetic flux concentrator, and of the metallic heat sink plate is between 4 mm and 12 mm.

6. The induction heater according to claim 1, wherein a first thickness of the at least one magnetic flux concentrator is either less than or equal to 4 mm; and a second thickness of the metallic heat sink plate is either less than or equal to 3 mm.

7. The induction heater according to claim 1, wherein a first thickness of the first electrically insulating sheet is comprised between 0.025 mm and 1 mm; a second thickness t of the second electrically insulating sheet is comprised between 0.025 mm and 1 mm; a third thickness t of each inductor is comprised between 0.1 mm and 0.5 mm; a fourth thickness of the at least one magnetic flux concentrator is comprised between 2 mm and 4 mm; and a fifth thickness of the metallic heat sink plate is comprised between 0.5 mm and 3 mm.

8. The induction heater according to claim 1, wherein a thickness t of each inductor is comprised between 100 μm and 500 μm.

9. The induction heater according to claim 1, wherein the at least one magnetic flux concentrator has an upper face adjacent to the second electrically insulating sheet, and a lower face adjacent to the metallic heat sink plate.

10. The induction heater according to claim 1, wherein for each inductor, a diameter A of a circumference circumscribed by the outermost turn is comprised between 30 mm and 240 mm and wherein a minimum distance between two consecutive inductors is comprised between 5 mm and 20 mm.

11. The induction heater according to claim 1, wherein the first electrically insulating sheet is made of mica or polymeric material, the second electrically insulating sheet is made of mica or polymeric material, and wherein the metallic heat sink plate is made of aluminum or alloy comprising aluminum.

12. The induction heater according to claim 1, wherein each inductor is configured to provide a maximum power comprised between 300 W and 1000 W.

13. The induction heater according to claim 1, wherein the electronic power module comprises an electronic board, and wherein a plurality of spacers is provided between the electronic board and the metallic heat sink plate.

14. The induction heater according to claim 1, wherein a second overall thickness comprised between a lower surface of the electronic power module and an upper surface of the first electrically insulating sheet is between 14 mm and 26 mm.

15. The induction heater according to claim 1, wherein each inductor has an upper side which adheres to the first electrically insulating sheet and a lower side which adheres to the second electrically insulating sheet.

16. The induction heater according to claim 1, wherein a number of turns of each inductor is comprised between twenty-five and seventy-five turns.

17. The induction heater according to claim 1, wherein a distance between a barycenter of each inductor and the at least one magnetic flux concentrator is comprised between 200 μm and 1000 μm.

18. A cook top comprising at least one induction heater according to claim 1.

19. The cook top according to claim 18 further comprising an upper surface arranged as a resting surface for at least one saucepan to be heated, and a lower surface positioned opposite to the upper surface, wherein a distance between a barycenter C of each of the one or more inductors and said lower surface is less than 3 mm.

* * * * *